E. OHRN.
AUTOMATICALLY OPERATING NEST FOR POULTRY.
APPLICATION FILED JUNE 3, 1919.
1,436,899.
Patented Nov. 28, 1922.
2 SHEETS—SHEET 1.
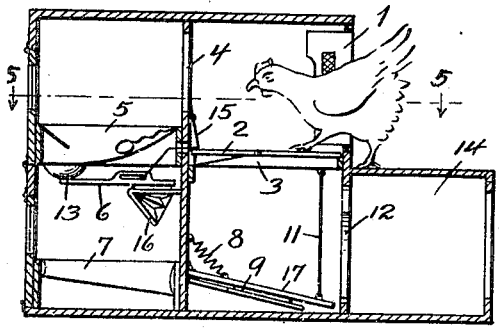
FIG.1.
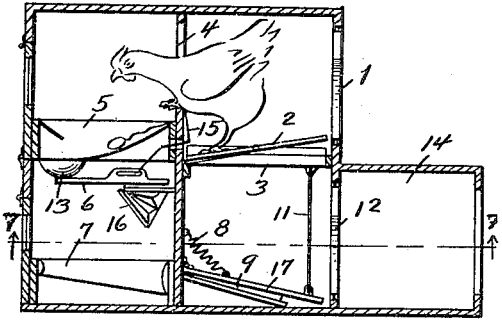
FIG.2.
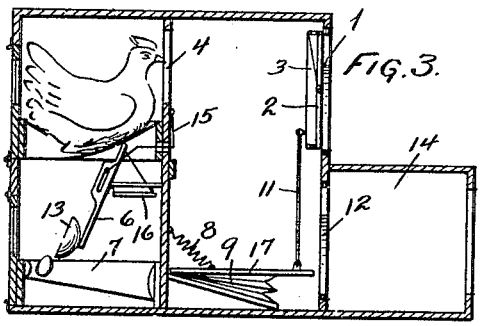
FIG.3.
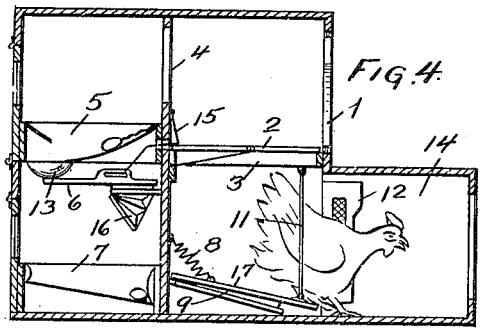
FIG.4.
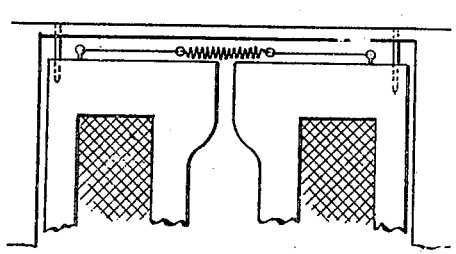
FIG.5.
FIG.6.
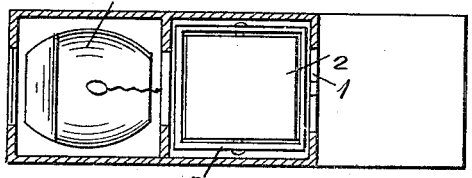
FIG.7.
FIG.8.
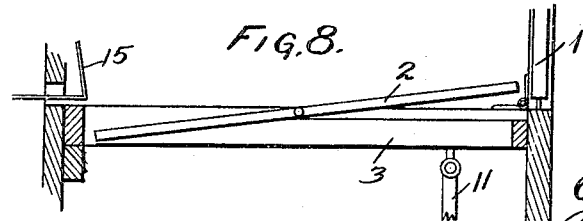
Inventor,
Erling Ohrn,
By M. E. Coulter,
attorney E. OHRN.
AUTOMATICALLY OPERATING NEST FOR POULTRY.
APPLICATION FILED JUNE 3, 1919.
1,436,899.
Patented Nov. 28, 1922.
2 SHEETS—SHEET 2.
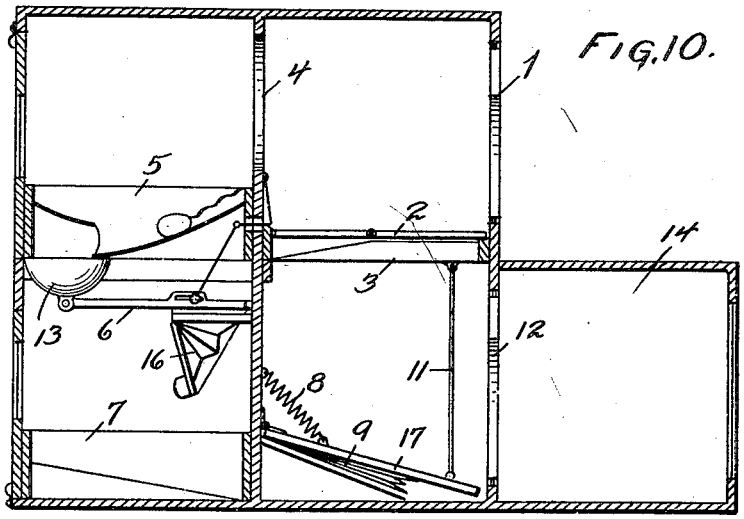
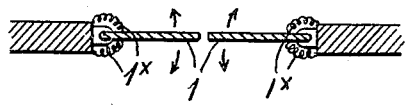
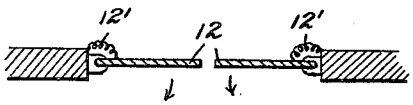
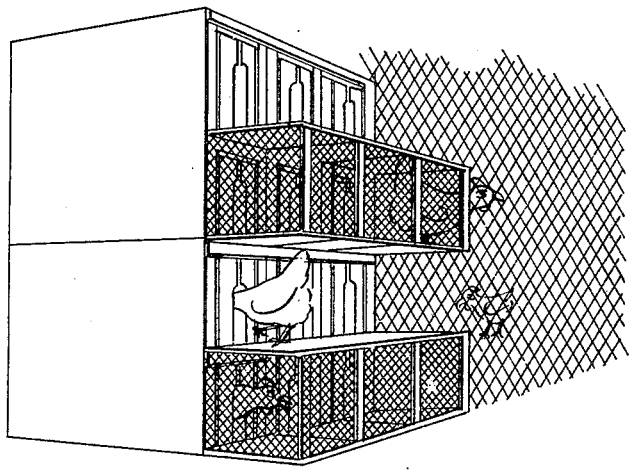
Inventor:
Erling Ohrn,
By Wm E Poulter,
attorney Patented Nov. 28, 1922.

1,436,899

UNITED STATES PATENT OFFICE.

ERLING OHRN, OF RJUKAN, NORWAY.

AUTOMATICALLY-OPERATING NEST FOR POULTRY.

Application filed June 3, 1919. Serial No. 301,483.

*To all whom it may concern:*

Be it known that I, ERLING OHRN, a subject of the King of Norway, residing at Rjukan, Norway, have invented certain new and useful Improvements in Automatically-Operating Nests for Poultry; and I do hereby declare the following to be a full, clear, and exact description of the invention, such as will enable others skilled in the art to which it appertains to make and use the same, reference being had to the accompanying drawings, and to figures of reference marked thereon, which form a part of this specification.
Many of the known types of trap-nests for poultry have the disadvantage that after the fowl has entered the nest it cannot leave it unaided, and therefore work is involved in watching the nests and liberating the fowls.

According to the present invention the egg by gravity operates a lever-arrangement which opens a door into a special enclosure for the laying fowls.
The egg is afterwards removed from the nest, so that any trouble caused by the fowl's dirty feet, or the breaking or eating of the eggs by the fowls is avoided.

When a fowl has entered a nest, the entrance is automatically closed, with the result that the fowl cannot be disturbed by others. If no egg is laid, the fowl can only come out by the same way that it entered. If it is desired to remove brood-eggs from certain fowls, this can be done by closing the exit.

In the drawing the arrangement and operation of an automatic trap-nest is shown by way of example.
Figures 1 to 4 inclusive are vertical sectional views showing the parts of the device in different operating positions. Figure 5 is a horizontal sectional view on line 5—5 of Fig. 1. Figure 6 is a detail view of a portion of the device. Figure 7 is a horizontal sectional view on line 7—7 of Fig. 2. Figure 8 is a detail view partly in section showing one of the folding doors, the tilting board, the supporting frame for the latter, and the catch. Figure 9 is a perspective view showing six of the devices arranged in two superposed rows, three devices in each row. Figure 10 is a vertical sectional view of a nest in position for a fowl to enter. Figures 11 and 12 are detail views.

The fowl enters through folding doors 1 and treads on a board 2 which by means of two journals is mounted as a floor in the frame 3 in such way that when a fowl treads on the inner part of the board this latter tilts and blocks the entrance doors 1 for incoming fowls, so the doors are unable to move inwards on account of the raised outer edge of the board, which in this way prevents other fowls from disturbing the layer.

Then the fowl enters through an opening 4 to the nest 5 which may be of any convenient shape, there being attached a nest-egg inside (for instance attached to a line).

If the fowl does not lay any egg it can only come out the same way it entered and tilts at the same time the board 2 back again into its original position by treading on the outer part of the board and in this way bringing the apparatus back again in ready position for the next layer.

If the fowl has laid an egg, the latter will at once fall down through an opening in the nest and into a receiver 13 fixed to a lever 6 which, owing to the weight of the egg, tilts down and places the egg in a box 7, at the same time disconnecting the frame 3 from a catch 15; the frame 3 and the board 2 then, by means of a spring 8, rise and lock the entrance 1. The lever 6 with the receiver 13, then is lifted by the aid of a spring or counter-weight, the motion being smoothed by means of a braking device as a bellows 16.

By the upward movement of the frame 3 with the board 2 this latter is brought into its original position in relation to the frame 3, parallel to the frame, the outer end of the board 2 being pressed against the wall of the box.

The motion of the frame 3 is effected by a spring 8 which is fixed to the wall of the box and to the board 17, from which in turn a rod 11 transfers the motion to the frame 3.

The fowl can now jump down on the board 17 and go out through folding doors 12 which only open outwards, and thus it enters an enclosure 14. The latter has no lateral walls and consequently serves as a passage common to all the apparatuses placed side by side. This passage leads to any convenient yard or run to which only the layers get admission, thus separating them from the non-layers. When the fowl jumps down on the board 17 the latter is pressed down and draws, by means of a rod 11, the frame 3 with the board 2 into its original position, the opening 1 being again free to give access to the next fowl. The braking device 9, which can be of any convenient construction, serves to smooth the up-and down movement of the frame 3.

If individual control of the nests—for instance for the purpose of taking brood-eggs from certain fowls,—is desired, this is rendered possible by locking the door 12, so that the fowl is prevented from leaving the trap-nest.

The doors 12 are swinging doors adapted to be each held in normal closed position by means of a suitably arranged spring as 12′. These doors are arranged so as to swing outwardly only. The doors 1 are adapted to normally swing both ways and are held in their closed position by means of suitably arranged springs 1ˣ. As soon as board 2 is brought into the position shown in Fig. 2 doors 1 are prevented from swinging inwardly.

I claim:

1. In a poultry nest, the combination with a casing having an entrance for the fowl, and swinging doors adapted to swing outwardly only and arranged to permit exit of the fowl from the casing only after said fowl has laid, of a pivotally arranged board within the casing adapted to tilt and close the entrance when a fowl treads upon one end of the board, a frame pivoted at one end and supporting the said board, a latch normally holding said frame in horizontal position, a pivotally arranged lever adapted to be tilted by the weight of an egg, said latch being operated by the tilting of the pivoted lever to release the said frame, and means arranged to move the frame when released by the latch, and also the pivoted board into a position to close the entrance to the casing.

2. In a poultry nest, the combination with a casing having an entrance for the fowl, and swinging doors adapted to swing outwardly only and arranged to permit exit of the fowl from the casing only after the fowl has laid, of a pivotally arranged board within the casing adapted to tilt and close the entrance when a fowl treads upon one end of the board, a frame pivoted at one end and supporting the said board, a pivotally arranged lever adapted to be tilted by the weight of an egg, a latch carried by said lever and normally engaging the pivoted frame, said latch being operated by the tilting of the pivoted lever to release the said frame, a pivotally arranged member upon which the fowl will tread before leaving the casing, the before-mentioned outwardly swinging doors being located in such position relatively to the said pivotally arranged member that the fowl will pass outwardly through said doors after having tread upon the said pivotally arranged member, and a rod connecting said pivotally arranged member and the pivoted frame and adapted to tilt the latter back into normal position in engagement with the latch to again uncover the entrance.

3. In a poultry nest, the combination with a casing having an entrance for the fowl, and swinging doors adapted to swing outwardly only and arranged to permit exit of the fowl from the casing only after said fowl has laid, of a pivotally arranged board within the casing adapted to tilt and close the entrance when a fowl treads upon one end of the board, a frame pivoted at one end and supporting the said board, a latch normally holding said frame in horizontal position, a pivotally arranged lever adapted to be tilted by the weight of an egg, the said latch being operated by the tilting of the pivoted lever to release the said frame, a bellows upon which the fowl will tread before leaving the casing, the before-mentioned outwardly-swinging doors being located in such position relatively to the said bellows that the fowl will pass outwardly through said doors after having trodden upon said bellows, a rod connecting the bellows with the pivoted frame, and a spring operating to open out the bellows and cause the rod to tilt the pivoted frame when released by the latch, as well as the board carried thereby, into a position closing the entrance to the casing.

In testimony that I claim the foregoing as my invention, I have signed by name in presence of two subscribing witnesses.

ERLING OHRN.

Witnesses:
 MOGUSS BUGGE,
 OLGA MÜLLER.